United States Patent
Das

(10) Patent No.: US 9,288,116 B2
(45) Date of Patent: Mar. 15, 2016

(54) SYSTEM AND METHOD FOR NAS SERVER TEST LOAD GENERATION

(71) Applicant: FutureWei Technologies, Inc., Plano, TX (US)

(72) Inventor: Kalyan Das, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 276 days.

(21) Appl. No.: 13/730,174

(22) Filed: Dec. 28, 2012

(65) Prior Publication Data

US 2014/0189134 A1  Jul. 3, 2014

(51) Int. Cl.
*H04L 29/06* (2006.01)
*H04L 12/24* (2006.01)
*H04L 29/08* (2006.01)

(52) U.S. Cl.
CPC .......... *H04L 41/145* (2013.01); *H04L 67/1097* (2013.01); *H04L 67/14* (2013.01); *H04L 67/145* (2013.01); *H04L 67/146* (2013.01)

(58) Field of Classification Search
None
See application file for complete search history.

(56) References Cited

U.S. PATENT DOCUMENTS

| 7,287,082 | B1* | 10/2007 | O'Toole, Jr. | 709/228 |
| 7,567,793 | B1* | 7/2009 | Saito et al. | 455/403 |
| 8,131,667 | B1* | 3/2012 | Snider | 707/609 |
| 2011/0090867 | A1* | 4/2011 | Sono | 370/331 |
| 2012/0253745 | A1* | 10/2012 | Dhanapal et al. | 702/186 |
| 2012/0311387 | A1* | 12/2012 | Santhosh et al. | 714/33 |
| 2014/0082288 | A1* | 3/2014 | Beard et al. | 711/123 |

* cited by examiner

*Primary Examiner* — Chris Parry
*Assistant Examiner* — Stephen Houlihan
(74) *Attorney, Agent, or Firm* — Slater & Matsil, L.L.P.

(57) ABSTRACT

System and method embodiments are provided herein to test Network Attached Storage (NAS) server performance by generating a sufficient load in NAS client sessions. A test device is configured to run as many needed NAS clients to generate enough NAS session load for evaluating the NAS server performance. An embodiment comprises a method for testing a NAS server comprising starting a NAS client, establishing a session between the NAS client and the NAS server, exchanging communications for the session at a network stack layer below the NAS client, terminating the NAS client, starting a second NAS client, establishing a subsequent session between the second NAS client and the NAS server, exchanging communications for the subsequent session at the network stack layer while exchanging communications for the session, and terminating the second NAS client.

22 Claims, 2 Drawing Sheets

SYSTEM AND METHOD FOR NAS SERVER TEST LOAD GENERATION

TECHNICAL FIELD

The present invention relates to network storage and communications, and, in particular embodiments, to a system and method for Network Attached Storage (NAS) server test load generation using NAS client sessions.

BACKGROUND

A NAS server provides clients over a network remote access and storage to a local file system through Network File System (NFS) or Server Message Block (SMB) (e.g., Common Internet File System (CIFS) and SMB2) protocols. A NAS server needs to be tested for the maximum amount of file system inputs/outputs (IOs), the maximum volume of network traffic, and the maximum number of concurrent sessions that the server can handle. A common issue in testing a NAS server is the inability of the testing devices to generate enough sessions and network traffic that can substantially stretch or press a NAS server, and hence accurately test the server's performance.

Remote file access protocols, such as NFSv4, CIFS, and SMB2 are state-full and complex. Hence, the NAS clients that access the NAS server are typically heavyweights (i.e., complex processes that require significant amount of resources, such as memory and computing resources) to establish and maintain sessions. The NAS clients are also optimized for performance, e.g., by caching data locally and thereby consuming more local resources. Such features make it difficult to create and maintain enough client sessions (e.g., thousands of sessions) in a single load generating device for the purpose of testing the NAS server. Further, since an objective of an optimized NAS client is minimizing network traffic, the suitability of a NAS client to be a NAS traffic generator is further diminished Equipment vendors develop test devices which are typically lightweights (i.e., consume less resources) and reside in the network stack, and thus can generate more sessions and traffic in comparison to real NAS clients. These devices require significant amount of engineering resources for initial development and subsequent maintenance.

SUMMARY OF THE INVENTION

In accordance with a preferred embodiment of the present invention, a method for testing an Network Attached Storage (NAS) server, the method comprising identifying, by a network stack, a session established by a NAS client for testing a load of the NAS server, intercepting and taking over, at the network stack, the session, instructing, by the network stack, to terminate the NAS client, and communicating a data request for the session to the NAS server.

In accordance with another preferred embodiment of the present invention, a network component for testing a NAS server, the network component comprising a processor and a computer readable storage medium storing programming for execution by the processor. The programming includes instructions to identify, by a network stack, a session established by a NAS client for testing a load of the NAS server, intercept and take over, at the network stack, the session, instruct to terminate the NAS client, and communicate a data request for the session to the NAS server.

In accordance with another preferred embodiment of the present invention, a method for testing a NAS server to handle NAS session load, the method comprising receiving one or more data requests for a session which is established by a NAS client to test a load of the NAS server, wherein the one or more data requests are generated by a network stack layer on behalf of the NAS client, and while receiving the one or more data requests for the session, receiving one or more subsequent data requests for a subsequent session which is established by an additional NAS client to test a load of the NAS server, wherein the one or more subsequent data requests are generated by the network stack layer on behalf of the additional NAS client.

In accordance with another preferred embodiment of the present invention, a NAS server configured to operate in a test mode, the NAS server comprising a processor and a computer readable storage medium storing programming for execution by the processor. The programming includes instructions to receive one or more data requests for a session which is established by a NAS client to test a load of the NAS server, wherein the one or more data requests are generated by a network stack layer on behalf of the NAS client, and while receiving the one or more data requests for the session, receive one or more subsequent data requests for a subsequent session which is established by an additional NAS client to test a load of the NAS server, wherein the one or more subsequent data requests are generated by the network stack layer on behalf of the additional NAS client.

An advantage of a preferred embodiment of the present invention is testing a NAS server performance by generating a sufficient load in NAS client sessions. A test device is configured to run as many needed NAS clients to generate enough NAS session load for evaluating the NAS server performance. This number of sessions can be increased with enough load to stretch or press the NAS server and hence accurately test the server's performance for real case scenarios.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
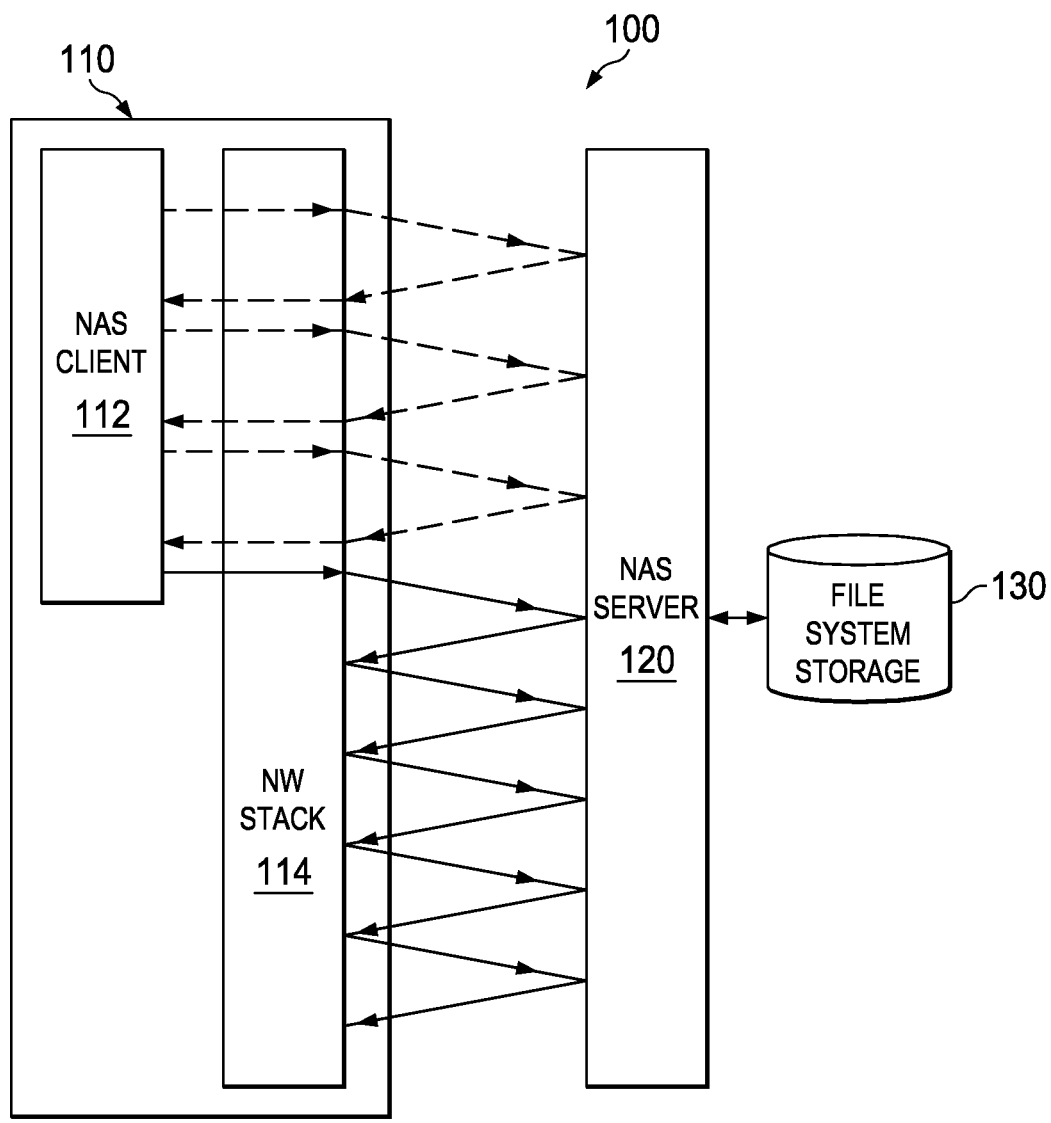
FIG. 1 is a an embodiment of a NAS server test system.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Developing a NAS client, even a relatively lightweight client (e.g., a lightweight SMB client) can be challenging. For example, a substantial and complex part of the client code is related to authenticating users with domain level credentials to establish sessions. Other functions are also needed for mapping shares, browsing directories, and opening files. Such functions (including authentication) are usually applied before beginning transmitting traffic over an established session between a NAS client and a NAS server (over the network).

System and method embodiments are provided herein to test NAS server performance by generating a sufficient load in NAS client sessions. A test device is configured to run as many needed NAS clients (e.g., standard NAS clients or applications) to generate enough NAS session load for evaluating the NAS server performance. Specifically, a test application (or component) is added at the network stack layer at the test device. As such, a NAS client is used to establish a session, authorize a user, connect or map shares, open files, and/or perform other client functionalities. The session is then intercepted and taken over by the test application at the network stack layer. Taking over a session, which is initially established by the client, at the network stack layer is also referred to herein as hijacking. At this point, the client application and the process that initiated the session are terminated, thereby releasing substantially all resources associated with the session, e.g., memory and processor resources. However, the session and related communications continue to exist between the test application at the network stack layer and the NAS server, which may use substantially less or minimal resources. The session related data exchanges and requests (e.g., for READ and WRITE operations) can be established in accordance with any used protocol specifications. The requests are forwarded to the NAS server and the respective responses are also received accordingly at the network stack layer. Exchanging session data at the network stack layer releases resources at the upper layer, e.g., the application layer. The released or freed resources can then be used to establish new sessions. Thus, the device's limited resources are managed to allow more session communications in comparison to typical NAS client operation schemes.

Since the session initiating client process and application are terminated while the session communications are maintained with the NAS server at the network stack layer, no additional or substantial overhead (or resource) is incurred for this intercepted and hijacked session. More sessions can be created at the NAS client in this manner using only the resource needed for exchanging session communications at the network stack layer. This allows increasing the number of sessions with enough load to stretch or press the NAS server and hence accurately test the server's performance for real case scenarios. For example, hundreds or thousands of sessions can be generated, intercepted and hijacked, and then kept active at about the same time to simulate typical amount of NAS clients and session traffic in real case scenarios.

FIG. 1 illustrates an embodiment of a NAS test system 100, which comprises one or more test client devices 110 coupled to a NAS server 120, e.g., via one or more networks and links (not shown). The NAS server 120 is also coupled to at least one file system storage 130. The test client device 110 communicates with the NAs server 120 to access (read) or place (write) data in the file system storage 130. The test client device 110 may be any client network component that comprises a NAS client 112, e.g., a standard or typically configured NAS client), and a network stack 114. For instance, the NAS client 112 and the network stack 114 are applications that run on the test client device 110. In different embodiments, the NAS client 112 and the network stack 114 may be implemented using software, hardware, or both. The test client device 110 can be used in the system 100 to generate NAS sessions between the test client device 110 and the NAS server 120 with sufficient load to accurately test the server's performance.

The NAS client 112 can establish a session with the NAS server 120 with credentials of a domain user. The NAS client 112 then mounts a share and opens a file for data exchange. A test application for generating traffic inspects the packets for the session as they travel through the network stack 114. Upon establishing the session, mapping a share, and opening a file, one or more READ or WRITE request for the session are intercepted by the test application at the network stack 114. Hence, a signal can be sent by the test application to the operating system (OS) of the NAS client 112 or test client device 110 to terminate the NAS client process. However, the session (e.g., a TCP session) between the network stack 114 and the NAS server 114 is kept alive or active at the network stack 114. The data exchanges and requests (e.g., READ/WRITE commands) are then repeated from the network stack 114 with any necessary modifications, such as for Message ID, to keep the session legitimate to the NAS server 120.

The process above can be repeated by creating more NAS clients 112 (client applications) and intercepting and hijacking the client's generated sessions by the test application of the network stack 114. The hijacked sessions of the different NAS clients can be kept active by repeating the intercepted requests of the sessions. As a result, only the NAS traffic between the network stack 114 of the test client device 110 and the NAS server 120 remains active, and no data is moved above the network stack layer. Thus, no additional resources are needed to maintain the remaining active NAS sessions, and a maximum amount of NAS traffic can be generated for a given hardware configuration and available resources.

In some scenarios, NAS traffic requirements include using integrity (signing) and/or privacy (encryption) to protect data on the link. In such scenarios, the test traffic (for the active sessions) generated at the network stack layer are expected to satisfy the integrity/encryption requirements. To realize this, the test application at the network stack 114 implements integrity/encrypting for test data (for the active sessions) to ensure that the additional resources required for providing integrity/encryption are considered (in terms of allocated resources) while generating the test traffic. Since the session is intercepted by the network stack 114, the signing or encryption key established between the NAS client 112 and the NAS server 120 may not be available to use in the hijacked session. To overcome this issue, the signing/encryption feature is enabled using a known or pre-determined key to sign/encrypt and validate/decrypt the test traffic on both ends of the link. Specifically, the NAS server 120 is configured with a a default (or pre-determined) key for communicating hijacked and encrypted sessions with one or more test client device 110.

Advantages of the NAS test system 100 include improved utilization of hardware (that runs NAS clients) in generating traffic for NAS sessions. The introduced configurations may be added with relatively low effort (e.g., software based) and can be used with standard off-the-shelf NAS client device. The configurations also enable newer or updated NAS clients that can be used, e.g., for testing NAS server load and performance, without incurring additional or substantial cost.

Figure 2:
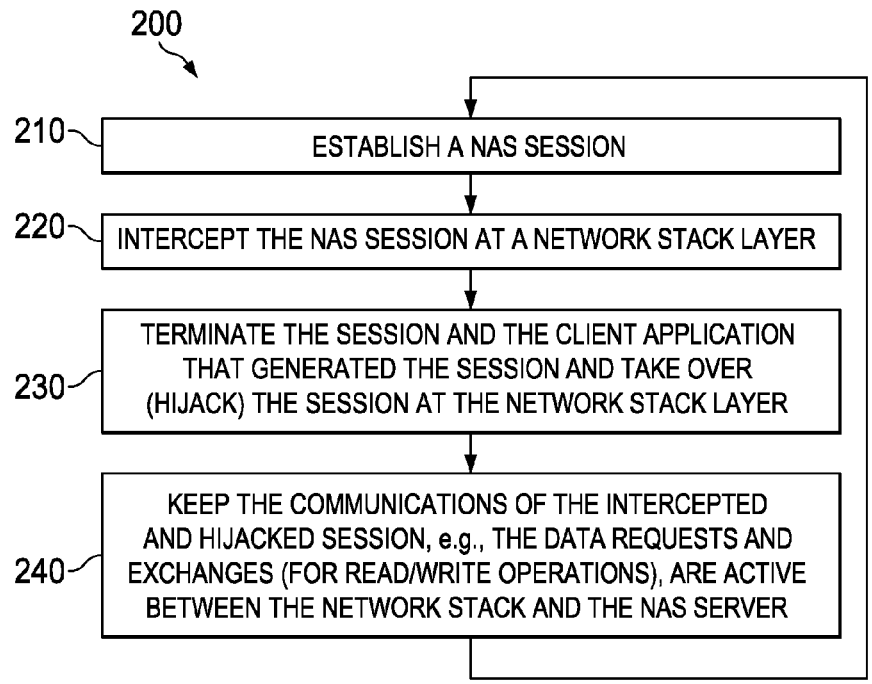
FIG. 2 is an embodiment method for testing a NAS server.

FIG. 2 illustrates an embodiment method 200 for testing a NAS server. The method 200 may be implemented by a test device or component, such as the test client device 110 in the system 100. For example, the method 200 involves a standard NAS client component or application, such as the NAS client 112, and a test component or application operating at the network stack layer (below the NAS client application layer), such as the network stack 114. At step 210, a NAS session is established (e.g., by the NAS client). This step also includes other functions (e.g., for user authorization, connecting or mapping shares, and/or opening files) implemented by the client before exchanging data requests (READ/WRITE requests) for the NAS session with a NAS server.

At step 220, the NAS session is intercepted at a network stack layer (e.g., on the client end). At step 230, the session and the client application that generated the session are terminated and the session is taken over (hijacked) at the network stack layer. The session may be intercepted and hijacked by a test application operating at the network stack layer. At step 240, the communications of the intercepted and hijacked session, e.g., the data requests and exchanges (for READ/WRITE operations), are kept active between the network stack and the NAS server. The test application may intercept one or more initial requests (READ/WRITE requests) of the session and repeats the requests to keep the session alive even after terminating the client application and its processes.

The method 200 then returns to step 210 to repeat establishing in turn a plurality of sessions, intercepting and hijacking the sessions communications at the network stack, and terminating the NAS client. For instance, one or more NAS clients and sessions can be established in sequence or at a turn and then terminated to allow, using the same resources, for establishing subsequent clients and sessions. Thus, as many client applications and sessions can be established and terminated, while keeping the sessions communications alive at the network stack layer. The method 200 allows using a limited number of resources at the NAS client device to keep multiple sessions alive by sharing some resources to establish multiple sessions in sequence or turn, and fewer resources to maintain the sessions communications alive at the network stack layer.

Figure 3:
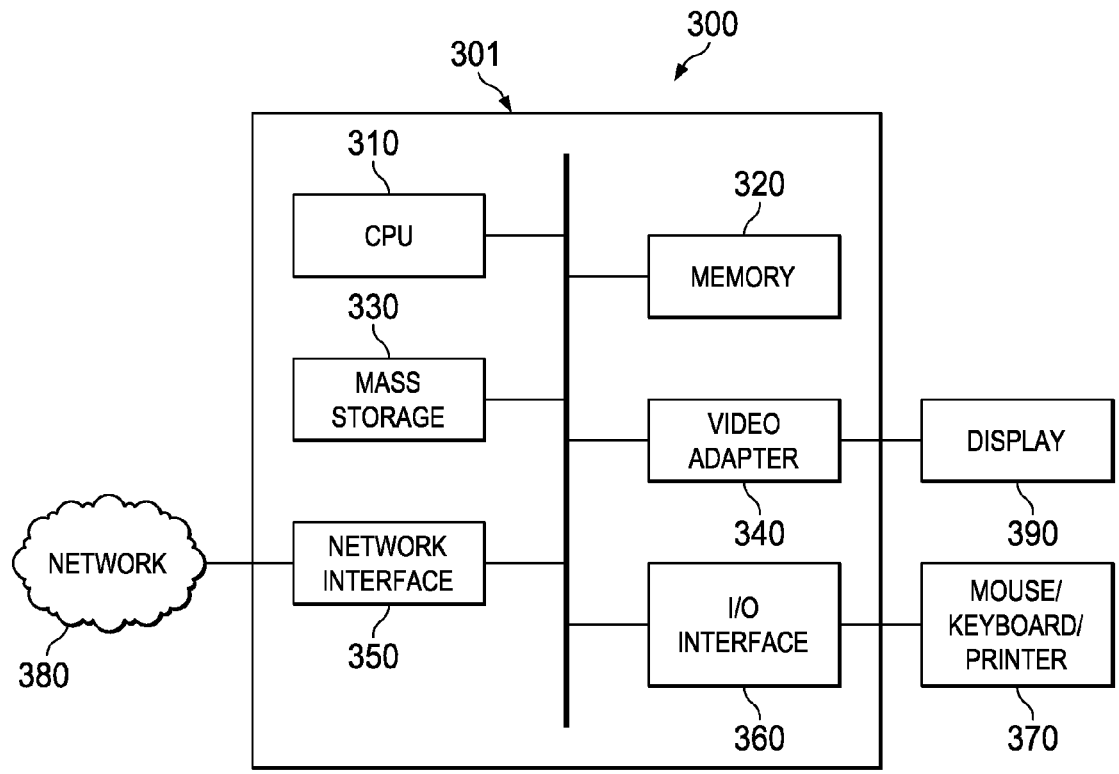
FIG. 3 is a processing system that can be used to implement various embodiments.

FIG. 3 is a block diagram of a processing system 300 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a speaker, microphone, mouse, touchscreen, keypad, keyboard, printer, display, and the like. The processing unit 301 may include a central processing unit (CPU) 310, a memory 320, a mass storage device 330, a video adapter 340, and an I/O interface 360 connected to a bus. The bus may be one or more of any type of several bus architectures including a memory bus or memory controller, a peripheral bus, a video bus, or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The video adapter 340 and the I/O interface 360 provide interfaces to couple external input and output devices to the processing unit. As illustrated, examples of input and output devices include a display 390 coupled to the video adapter 340 and any combination of mouse/keyboard/printer 370 coupled to the I/O interface 360. Other devices may be coupled to the processing unit 301, and additional or fewer interface cards may be utilized. For example, a serial interface card (not shown) may be used to provide a serial interface for a printer.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for testing a Network Attached Storage (NAS) server, the method comprising:
identifying, by a network stack of a test device, a session established by a NAS client for testing a load of the NAS server, the NAS client being an autonomous application instantiated on the same test device as the network stack;
intercepting and taking over, at the network stack, the session;
terminating the NAS client to release resources of the test device used to operate the NAS client; and
communicating a data request for the session from the network stack to the NAS server after terminating the NAS client, wherein communicating the data request for the session to the NAS server after terminating the NAS client exerts the load on the NAS server without using the resources of the test device to operate the NAS client.

2. The method of claim 1 further comprising:
identifying, by the network stack, one or more additional sessions established by one or more additional NAS clients;
intercepting and taking over, at the network stack, the one or more additional sessions;
terminating each of the one or more additional NAS clients; and
communicating a plurality of data requests for the one or more additional sessions to the NAS server while communicating the data request to keep the session alive.

3. The method of claim 2, wherein the data request are repeated by the network stack using modifications including Message ID changes to maintain the session with the NAS server.

4. The method of claim 2, wherein the data requests include a READ message request, a WRITE message request, or both.

5. The method of claim 2, wherein the session and the one or more additional NAS clients are terminated in sequence, and wherein the session and the one or more additional sessions are established at different times using at least some of the same resources.

6. The method of claim 1, wherein the NAS client operates at an application layer higher than the network stack, and wherein the network stack sends the data requests for the session using fewer resources than the NAS client at the application layer.

7. The method of claim 1 further comprising encrypting the data requests for the session using a pre-determined encryption key known to the NAS server for test client sessions.

8. A test device for testing a Network Attached Storage (NAS) server, the test device comprising:
   a processor; and
   a computer readable storage medium storing programming for execution by the processor, the programming including instructions to:
   identify a session established by a NAS client for testing a load of the NAS server, the NAS client being an autonomous application instantiated on the same test device as a network stack;
   intercept and take over the session at the network stack of the test device;
   terminate the NAS client to release resources of the test device used to operate the NAS client; and
   communicate a data request for the session from the network stack to the NAS server after terminating the NAS client, wherein communicating the data request for the session to the NAS server after terminating the NAS client exerts the load on the NAS server without using the resources of the test device to operate the NAS client.

9. The test device of claim 8, wherein the programming includes further instructions to:
   repeat, by the network stack, a plurality of the data requests for the session with the NAS server.

10. The test device of claim 8, wherein the programming includes further instructions to:
    identify, by the network stack, one or more additional sessions established by one or more additional NAS clients;
    intercept and take over, at the network stack, the one or more additional sessions in sequence;
    terminate each of the one or more additional NAS clients; and
    communicate a plurality of data requests for the one or more additional sessions to the NAS server while communicating the data request to keep the session alive.

11. The test device of claim 10, wherein the total number of NAS clients and corresponding sessions is determined to stretch the NAS server's capacity for handling multiple NAS sessions and load at the same time period.

12. The test device of claim 8, wherein the test device is coupled to the NAS server.

13. The test device of claim 8, wherein the communicated data request for the session with the NAS server are in accordance with a Network File System (NFS) protocol, a Server Message Block (SMB) protocol, a SMB2 protocol, or a Common Internet File System (CIFS) protocol.

14. A method for testing a Network Attached Storage (NAS) server to handle NAS session load, the method comprising:
   receiving one or more data requests for a session established by a NAS client to test a load of the NAS server, wherein the one or more data requests are received from a network stack layer of a test device after the NAS client has been terminated; and
   while receiving the one or more data requests for the session, receiving one or more subsequent data requests for a subsequent session established by an additional NAS client to test a load of the NAS server, wherein the one or more subsequent data requests are received from the network stack layer after the additional NAS client has been terminated, and wherein the NAS client and the additional NAS client are autonomous applications instantiated on the same test device as the network stack layer.

15. The method of claim 14 further comprising:
   sending one or more responses for the one or more data requests to the network stack layer; and
   sending one or more subsequent responses for the one or more subsequent data requests to the network stack layer while sending the one or more responses.

16. The method of claim 15 further comprising decrypting the one or more data requests and the one or more subsequent data requests and encrypting the one or more responses and the one or more subsequent responses using a pre-determined key for encrypting and decrypting test NAS client sessions.

17. A Network Attached Storage (NAS) server configured to operate in a test mode, the NAS server comprising:
   a processor; and
   a computer readable storage medium storing programming for execution by the processor, the programming including instructions to:
   receive one or more data requests for a session established by a NAS client to test a load of the NAS server, wherein the one or more data requests are received from a network stack layer of a test device after the NAS client has been terminated; and
   while receiving the one or more data requests for the session, receive one or more subsequent data requests for a subsequent session established by an additional NAS client to test a load of the NAS server, wherein the one or more subsequent data requests are received from the network stack layer after the additional NAS client has been terminated, and wherein the NAS client and the additional NAS client are autonomous applications instantiated on the same test device as the network stack layer.

18. The NAS server of claim 17, wherein the program includes further instructions to:
   send one or more responses for the one or more data requests to the network stack layer; and
   send one or more subsequent responses for the one or more subsequent data requests to the network stack layer while sending the one or more responses.

19. The NAS server of claim 17, wherein the program includes further instructions to decrypt the one or more data requests and the one or more subsequent data requests and encrypt the one or more responses and the one or more subsequent responses using a pre-determined key for encrypting and decrypting test NAS client sessions.

20. The NAS server of claim 17, wherein termination of the NAS client releases resources used to operate the NAS client, and wherein receiving the one or more data requests from the network stack layer after the NAS client has been terminated exerts the load on the NAS server without using the resources to operate the NAS client.

21. The method of claim 14, wherein termination of the NAS client releases resources used to operate the NAS client, and wherein receiving the one or more data requests from the network stack layer after the NAS client has been terminated exerts the load on the NAS server without using the resources to operate the NAS client.

22. The method of claim 1, wherein the resources are used to operate a different NAS client.

* * * * *